(No Model.) 2 Sheets—Sheet 1.

O. P. & M. T. BRINKER.
SHEAF GATHERER.

No. 450,136. Patented Apr. 14, 1891.

Witnesses
M. C. Fowler
Wm. Bagger

Inventors
Oliver P. Brinker and
Marion T. Brinker
By their Attorneys,
C. A. Snow & Co.

(No Model.) 2 Sheets—Sheet 2.
O. P. & M. T. BRINKER.
SHEAF GATHERER.
No. 450,136. Patented Apr. 14, 1891.
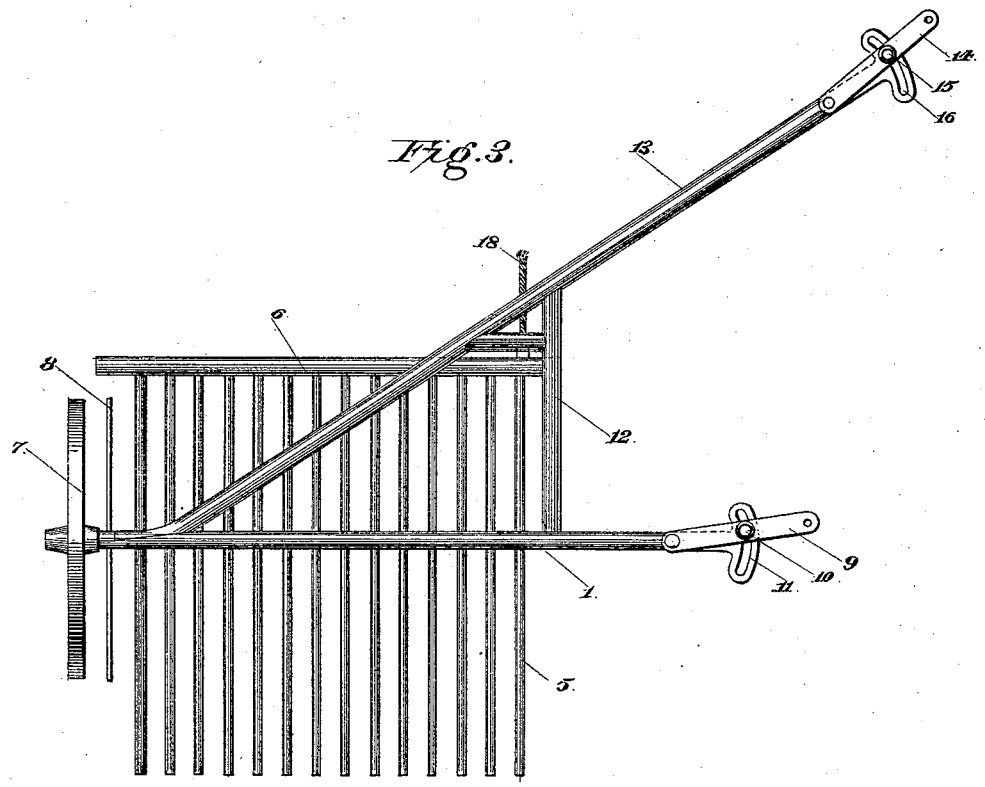
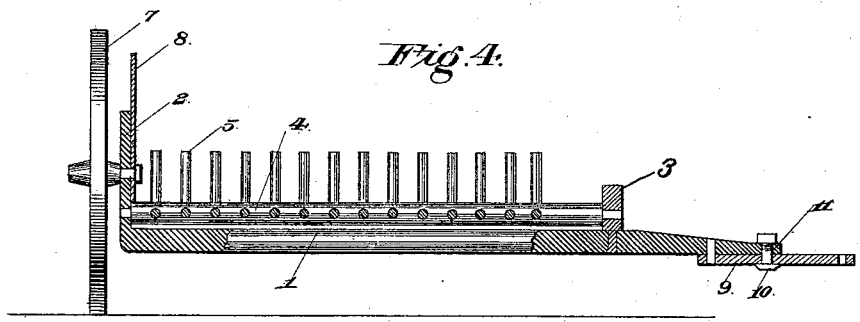
Witnesses
M. E. Fowler
By their Attorneys,
Wm. Bagger
Inventors
Oliver P. Brinker and
Marion T. Brinker
C. A. Snow & Co.

UNITED STATES PATENT OFFICE.

OLIVER P. BRINKER AND MARION T. BRINKER, OF NEBRASKA, OHIO.

SHEAF-GATHERER.

SPECIFICATION forming part of Letters Patent No. 450,136, dated April 14, 1891.

Application filed September 18, 1890. Serial No. 365,415. (No model.)

*To all whom it may concern:*

Be it known that we, OLIVER P. BRINKER and MARION T. BRINKER, citizens of the United States, residing at Nebraska, in the county of Pickaway and State of Ohio, have invented a new and useful Sheaf-Gatherer, of which the following is a specification.

This invention relates to sheaf-gatherers for harvesters; and it has for its object to provide a device of this class which shall be simple, durable, and easily operated.

With these ends in view the invention consists in the improved construction, arrangement, and combination of parts, which will be hereinafter fully described, and particularly pointed out in the claims.

Figure 1:
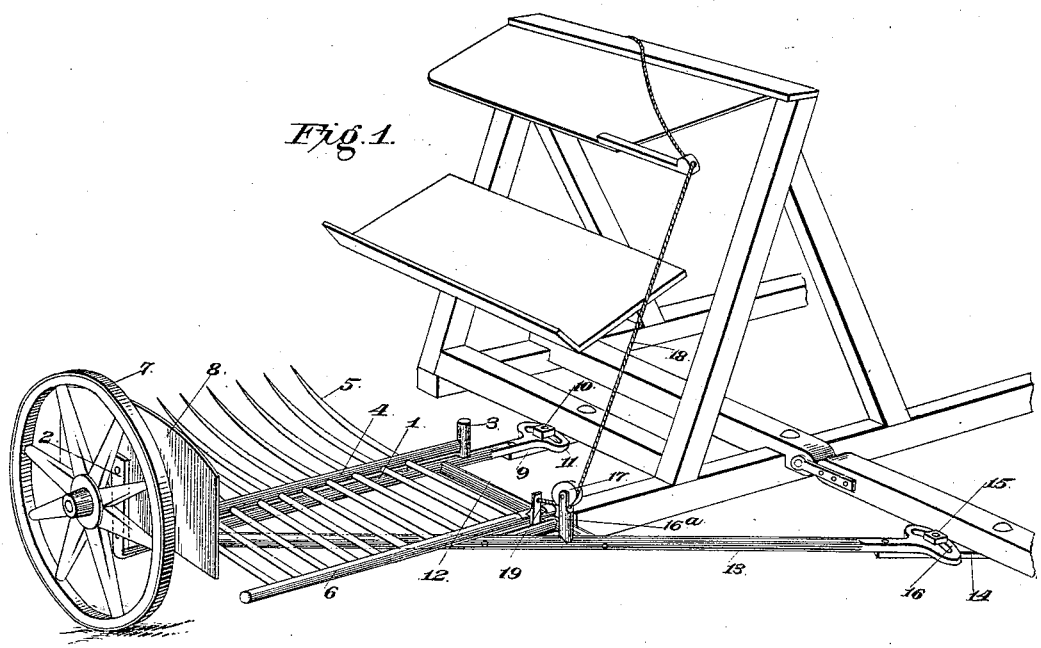
Figure 2:
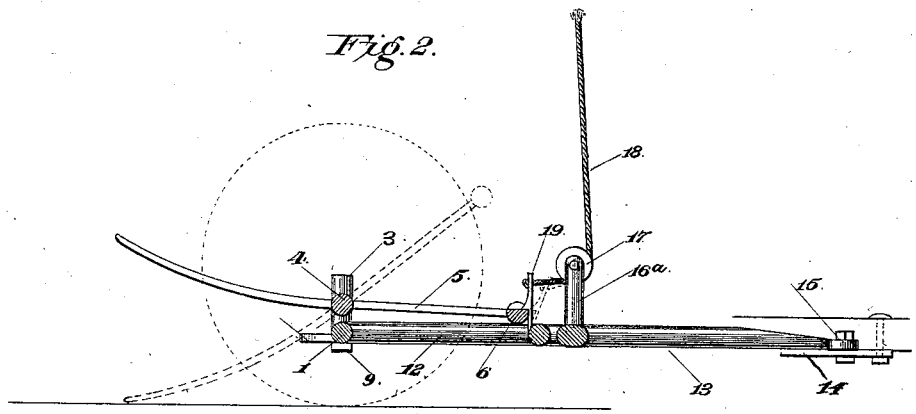

In the drawings hereto annexed, Figure 1 is a perspective view showing one side of the frame of a harvester to which my invention has been applied. Fig. 2 is a vertical sectional view of the device. Fig. 3 is a bottom view of the invention detached. Fig. 4 is a sectional view taken longitudinally through the axis of the attachment.

Like numerals of reference indicate like parts in all the figures.

The device which constitutes my invention is composed of a bar or axle 1, provided at one end with an upwardly-extending arm 2 and having near its other end a vertical bracket 3. The latter and the arm 2 are provided with bearings for a shaft 4, through which extends a series of tines 5, which are slightly curved in a rearward and upward direction. The front ends of the tines 5 are connected by a transverse rod or bar 6.

To the arm or bracket 2 at the outer end of the shaft 1 is journaled a wheel 7, inside of which is mounted a guard 8. The inner end of the shaft 1 is provided with a pivoted arm 9, having an adjusting-bolt 10, which works in a segmental slot 11 to enable the device to be properly attached and adjusted with relation to the frame of the harvester, in conjunction with which it is to be used.

The frame bar or shaft 1 is provided with a rearwardly-extending brace 12, and a diagonal arm 13 is secured to the said brace and to the outer end of the shaft 1. The inner end of the diagonal brace 13 has a pivoted arm 14 provided with an adjusting-bolt 15, that extends through a segmental slot 16 to enable the desired adjustment to be made.

Suitably secured to the brace 13 is an upright 16ª, at the upper end of which is journaled a pulley 17, over which passes a cord 18, the end of which is attached to a latch 19, of suitable construction, which serves to normally retain the sheaf-dropping platform in its proper position.

From the foregoing description, taken in connection with the drawings hereto annexed, the operation and advantages of my invention will be readily understood by those skilled in the art to which it appertains.

The method of attaching the device to an ordinary harvester will be easily understood when reference is had to Fig. 1 of the drawings. The sheaves formed by the binding mechanism are dropped onto the tilting table or platform until a sufficient quantity has been accumulated to form a shock. The driver or operator then by pulling the rope 18 releases the latch 19, thus causing the table to rotate upon its axis and dump the sheaves which are afterward gathered and shocked in the usual manner.

The tines 5 extend farther in rear than in front of the pivotal shaft 4. Hence the excess of weight of the sheaves in rear of said shaft will cause the platform to dump automatically when released from the latch 19. When the sheaves are dumped, however, the weight of the cross-bar 6 at the front end of the platform will be sufficient to restore the latter to its normal position.

Having thus described my invention, what I claim is—

1. In a sheaf-gathering attachment for harvesters, the combination of a bar or axle having an upwardly-extending arm at one end and provided near the other end with an upwardly-extending bracket, a wheel at the outer end of said shaft or axle, and a dumping-platform comprising a shaft mounted in the arm or bracket extending upwardly from said axle, tines extending through said shaft, and a cross-bar connecting the front ends of said tines and serving as a weight to restore the platform to normal position after dumping, substantially as set forth.

2. The combination, with a harvesting-machine, of a frame composed of a pair of bars joined near their outer ends and provided at their inner ends with pivoted arms having adjusting-bolts extending through segmental slots, the pivoted dumping table or platform mounted upon the said frame, and the latch to retain the said table normally in a horizontal position and a supporting wheel journaled at the outer end of the frame, substantially as set forth.

3. In a device of the class described, the combination, with the frame-bars having segmental slots at their inner ends, of the concentrically-pivoted arms having the adjusting-bolts, the pivoted table or dumping platform, the holding-latch, and the supporting-wheel, substantially as set forth.

In testimony that we claim the foregoing as our own we have hereto affixed our signatures in presence of two witnesses.

OLIVER P. BRINKER.
MARION T. BRINKER.

Witnesses:
FRED L. FICKARDT,
C. N. LOREY.